US006352657B1

(12) United States Patent
Veldhuis et al.

(10) Patent No.: US 6,352,657 B1
(45) Date of Patent: Mar. 5, 2002

(54) METHOD AND APPARATUS FOR MAKING FOAM/CONCRETE BUILDING PANELS

(75) Inventors: Robert Veldhuis; Lubo Krizik, both of Dundas (CA)

(73) Assignee: 888804 Ontario Limited (CA)

(*) Notice: Subject to any disclaimer, the term of this patent is extended or adjusted under 35 U.S.C. 154(b) by 0 days.

(21) Appl. No.: 09/341,903

(22) PCT Filed: Dec. 5, 1997

(86) PCT No.: PCT/CA97/00950

§ 371 Date: Feb. 3, 2000

§ 102(e) Date: Feb. 3, 2000

(87) PCT Pub. No.: WO98/25745

PCT Pub. Date: Jun. 18, 1998

(Under 37 CFR 1.47)

Related U.S. Application Data

(60) Provisional application No. 60/033,150, filed on Dec. 13, 1996.

(51) Int. Cl.[7] .......................... B29C 39/18; B29C 39/20; B29C 41/30

(52) U.S. Cl. ........................ 264/45.8; 264/45.9; 264/48; 264/259; 425/117; 425/122; 425/446; 427/133

(58) Field of Search ................................ 425/117, 122, 425/446; 264/45.8, 45.9, 48, 259; 427/403, 133

(56) References Cited

U.S. PATENT DOCUMENTS 2,835,924 A * 5/1958 Schmeling .................. 425/122
3,616,020 A * 10/1971 Whelan et al. ............. 427/209
3,865,525 A * 2/1975 Dunn .......................... 425/60
4,126,659 A * 11/1978 Blad ........................... 264/90
4,774,794 A * 10/1988 Grieb ........................ 52/309.7
4,783,298 A * 11/1988 Oda ........................... 264/155
4,883,960 A * 11/1989 Carter ..................... 427/430.1
4,889,669 A * 12/1989 Suzuki ...................... 264/45.9
5,286,320 A * 2/1994 McGrath et al. .............. 156/83
5,354,402 A * 10/1994 Luetkens, Jr. et al. .. 156/244.11
5,672,391 A 9/1997 Santarossa .................. 427/356
5,807,514 A * 9/1998 Grinshpun et al. ........ 264/46.6
5,951,805 A 9/1999 Nonis et al. ........... 156/244.12
5,965,075 A * 10/1999 Pauley et al. ............ 264/176.1
5,965,207 A * 10/1999 Kropfeld et al. ............ 427/403
5,989,473 A * 11/1999 Haverty ...................... 427/133

FOREIGN PATENT DOCUMENTS

| | | |
|---|---|---|
| CA | 2184205 | 9/1999 |
| DE | 28 04 326 A1 | 8/1979 |
| DE | 39 32 573 A1 | 4/1991 |
| WO | WO 96/31330 | 10/1996 |

* cited by examiner

*Primary Examiner*—Allan R. Kuhns
(74) *Attorney, Agent, or Firm*—Mark Kusner

(57) ABSTRACT

A continuous process is used to make concrete building products with an expanded polystyrene core. The expanded polystyrene is fed into the inlet of an elongated guiding channel which has a longitudinally split mold. The expanded polystyrene is guided along the guiding channel without any means for pulling the expanded polystyrene. Concrete is then pumped into the split mold first through an first aperture in a first mold section of the split mold and then through another aperture, in a second mold section of the split mold, so that the concrete is coated on at least two opposing sides of the expanded polystyrene.

16 Claims, 6 Drawing Sheets

METHOD AND APPARATUS FOR MAKING FOAM/CONCRETE BUILDING PANELS

This is a non provisional of 60/033,150 filed Dec. 13, 1996.

FIELD OF THE INVENTION

The present invention relates to a continuous process for making building products by coating an expanded polymeric form with a facing material, preferably concrete, stucco or plaster.

BACKGROUND TO THE INVENTION

Structural building blocks and non-structural mouldings made with a foam core and a concrete or plaster coating, are known. An example of such a structural building block with a concrete coating is shown in U.S. Pat. No. 4,774,794 to D. J. Grieb which issued Oct. 4, 1988. Generally, structural building blocks, made with a foam core and a concrete coating, allow interconnection with other blocks to produce a flat, two-sided panel for use in forming walls, floors, ceilings and related structures. It is preferable that the foam core be exposed on the edges where the panels interconnect so that there is a continuous core of insulating material. The building blocks tend to be impervious to humidity and water and resist cracking, rotting, weathering, fading and have other advantages It is also known to make blocks, panels and mouldings with a foam core and a concrete exterior using either a batch process, or a continuous process. For example, a pultrusion process is known in which a preformed foam core slab is pulled through a pultrusion mandrel by a roller chain with caterpillar gripping pads. Concrete mixtures are then fed into the pultrusion mandrel on both sides of the foam core slab. After sufficient curing of the concrete, the foam core block so formed can be cut with a travelling carbide tipped cut-off saw. One of the difficulties of this process is that there are significant problems caused by fouling of the chain with concrete, because of leakage of concrete onto and between the gripping pads and onto the chain and related surfaces. In addition, setting up the pultrusion mandrel is extremely time consuming and additional processing is required to remove excess foam material. An improved process is highly desirable and the present invention is directed to providing such an improvement.

It is proposed to make such building blocks with an alternative continuous process. Surprisingly, it has been found that it is possible to make such building panels without the need to pull the foam core through the process.

SUMMARY OF THE INVENTION

The present invention provides a continuous process, with upstream and downstream longitudinal directions, for making an elongated coated building product comprising a longitudinal expanded synthetic polymeric form having a desired cross-sectional shape, and having a longitudinally continuous coating of a facing material on at least a portion of a periphery of the cross-sectional shape, said process comprising:

a) feeding the expanded synthetic polymeric form longitudinally into the inlet of an elongated guiding channel which comprises a longitudinally split mould having an internal cross-sectional shape suitable to produce a desired external cross-sectional shape of the coated building product;

b) guiding the expanded synthetic polymeric form along the guiding channel, without any means for pulling the expanded synthetic polymeric form after the expanded synthetic polymeric form enters the inlet of the guiding channel;

c) feeding the facing material into the split mould through a first aperture in a first mould section of the split mould.

In an embodiment, the facing material is selected from the group consisting of concrete, gypsum, plaster. The concrete, gypsum or plaster may contain strengthening materials, e.g. glass fibre, cellulosic fibre.

In one embodiment, the split mould is a two-part split mould and the facing material is additionally fed through a second aperture in a second mould section of the split mould, so that the facing material is coated on at least two opposing sides of the expanded synthetic polymeric form.

In another embodiment, facing material is prevented from escaping upstream towards the inlet by sealing means between the split mould and the expanded synthetic polymeric form.

In a further embodiment, the coated building product is a moulding strip with at least one exposed face of the expanded synthetic polymeric form, in which process the exposed face is in sliding contact with a second mould section of a two-part split mould which has no apertures therein for introduction of facing material.

In another embodiment, the building product is a moulding strip and the facing material is plaster.

In yet another embodiment the expanded synthetic polymeric form is made from expanded polystyrene, polyurethane, phenolic or polyisocyanurate.

In a further embodiment, the building product is a building panel which is coated on at least two sides with concrete, in which process the expanded form is guided between first and second mould sections of a two-part split mould, concrete facing material is fed through a first aperture in the first mould section and through a second aperture in the second mould section.

In yet another embodiment, the building product is a building panel which is coated on at least two sides with the facing material and ties are inserted transversely, at longitudinally spaced intervals, through the expanded form prior to feeding the expanded synthetic polymeric form longitudinally into the inlet of the elongated guiding channel, such that when the expanded form is coated with the facing material, opposing coatings of facing material are tied together by the ties.

In another embodiment, the expanded form and the facing material are mechanically locked by means of mating shapes of contracting faces of the facing material and the expanded form. Preferably the mating shape is in the form of a dovetail joint.

In another embodiment, the process for making the building panel comprises:

(a) feeding the expanded synthetic polymeric form longitudinally into the inlet of the guiding channel and first and second mould sections of a two-part split mould are slidingly sealed against at least one of upper and lower portions of the expanded form;

(b) feeding facing material, selected from the group consisting of concrete and gypsum, into the split mould through the first aperture in the first mould section and through the second aperture in the second mould section.

In one embodiment, the second aperture is downstream of said first aperture and there are sealing strips between the expanded synthetic polymeric form and the first and second mould sections, at positions slightly upstream of the first and second apertures.

In another embodiment, there is a back pressure plate between the second mould section and the expanded synthetic polymeric form between the inlet of the guiding channel and the sealing strip which is upstream of the second aperture.

In a further embodiment, the polymeric expanded material is continuously provided from an extrusion or fusion machine upstream of the inlet to the guiding channel.

The present invention also provides an apparatus for a continuous process, with longitudinal upstream and downstream directions, for making an elongated coated building product comprising a longitudinal expanded synthetic polymeric form, said apparatus comprising:

a) an elongated guiding channel which has a longitudinally split mould having an internal cross-sectional shape suitable to produce a desired external cross-sectional shape of the coated building product, said guiding channel having an inlet and an outlet;

b) means for guiding the expanded synthetic polymeric form along the guiding channel, without any means for pulling the expanded synthetic polymeric form after the expanded synthetic polymeric form enters the inlet of the guiding channel;

c) means for feeding facing material into the split mould through a first aperture in a first mould section of the split mould; and d) sealing means in the guiding channel to prevent facing material escaping upstream between the expanded synthetic polymeric form and mould sections, towards the inlet of the guiding channel.

In one embodiment, there is means for feeding facing material into the split mould through a second aperture in a second mould section of the split mould.

In another embodiment, the second aperture is downstream of said first aperture and there is a sealing strip between the polymeric expanded material and the second mould section at a position slightly upstream of the second aperture.

In a further embodiment, an extrusion or fusion machine for continuously making polymeric expanded material is provided upstream of the inlet to the guiding channel, for feeding polymeric expanded material into the inlet of the guiding channel.

In yet another embodiment, there is means for inserting ties transversely through the expanded form, at longitudinally spaced intervals, between the extrusion or fusion machine and the inlet to the guiding channel, such that ends of the ties will protrude into the facing material.

BRIEF DESCRIPTION OF THE DRAWINGS

FIG. 1, is a cross-sectional view of a split mould, and a moulding strip in another guiding channel of the present invention.

DETAILED DESCRIPTION OF PREFERRED EMBODIMENTS

The present invention is useful for making building panels with and an expanded polymeric form, coated with a facing material. The preferred embodiments will generally be described hereinafter with reference to concrete, but it is to be understood that other facing materials may be used, e.g. plaster, gypsum.

Figure 1:
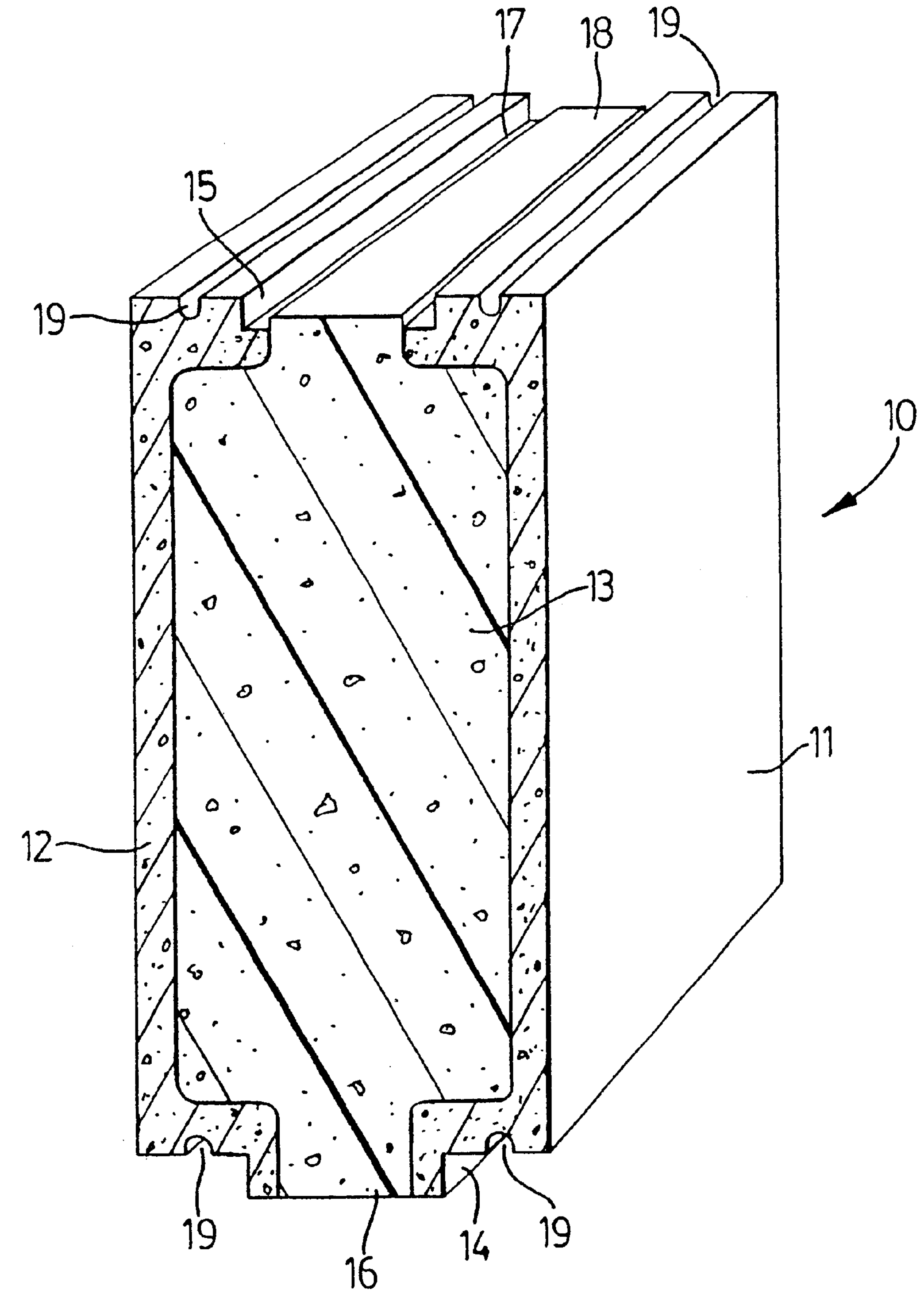
FIG. 1 is a cut-away section of a building panel made using a process of the present invention.

A cross-section of a building panel made in accordance with the present invention is shown in FIG. 1. The building panel 10 comprises an expanded synthetic polymeric form 13 sandwiched between layers of a facing material, e.g. concrete 12 and 13. In the embodiment shown, the longitudinal edges 16 and 18 of the expanded form 13 are exposed. The longitudinal edges of building panel 10 are made so that they will mate with adjacent corresponding building panels. In the embodiment shown, one longitudinal edge has a longitudinal tenon 14 and the other longitudinal edge has a longitudinal mortise 15. In order to ensure continuity of expanded synthetic polymeric form 13 between adjacent panels, it is preferable that the expanded synthetic polymeric form 13, at longitudinal edge 18 is proud of the bottom 17 of mortise 15. This provides spacing for adhesive material between adjacent panels in order to provide a tight joint. There may be control joint grooves 19. Typically, the expanded synthetic polymeric form is made of expanded polyurethane, polystyrene, phenolic or polyisocyanurate. When the synthetic polymer is foamed, e.g. foamed polyurethane, it is preferable that the foams are so-called closed-cell foams in order to provide greater impermeability to vapours and liquids. Expanded polystyrene is a preferred material for the expanded form and is usually made with a fusion process. The expanded form may have materials added to the polymer, e.g. recycled carpet fibre. For building panels the layers 12 and 13 typically are cementitious and typically comprise Portland Cement, sand, gravel and water and may include other additives known in the art. For example, strengthening materials such as glass fibre roving may be added. Other materials may be added to improve chemical stability, water-resistance, fire proofing or to colour the cement, e.g. latex, gypsum, pigments. As indicated above, other building panels may be made with facing material of gypsum, plaster of Paris and the like. Such materials may also include strengthening or other materials such as glass fibre, cellulosic fibre, pigments.

Figure 2:
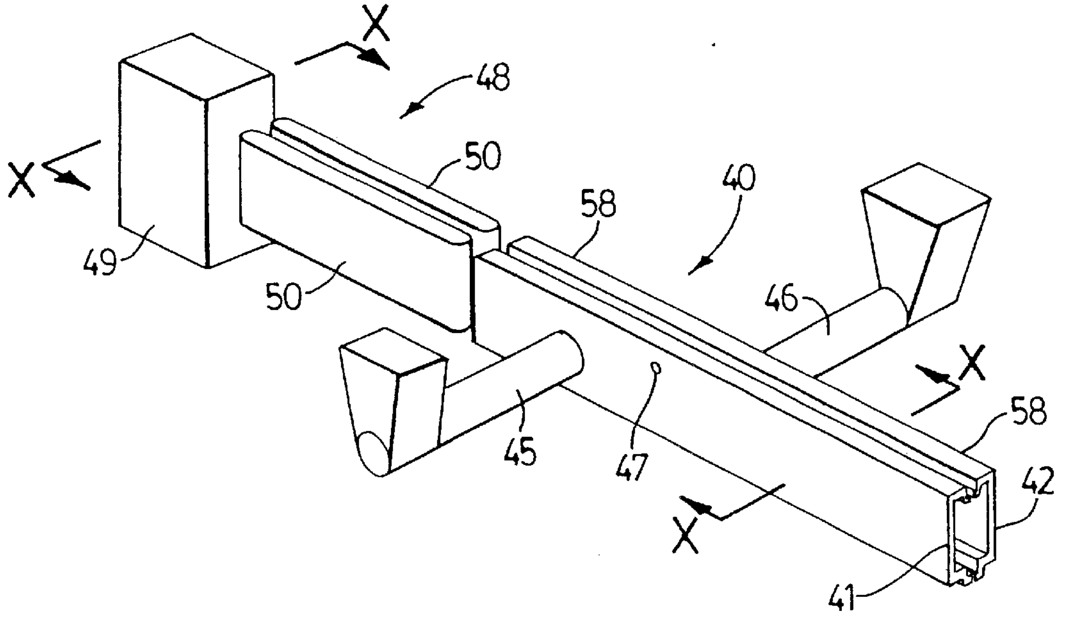
FIG. 2 is a schematic representation of apparatus used in the present invention.
Figure 3:
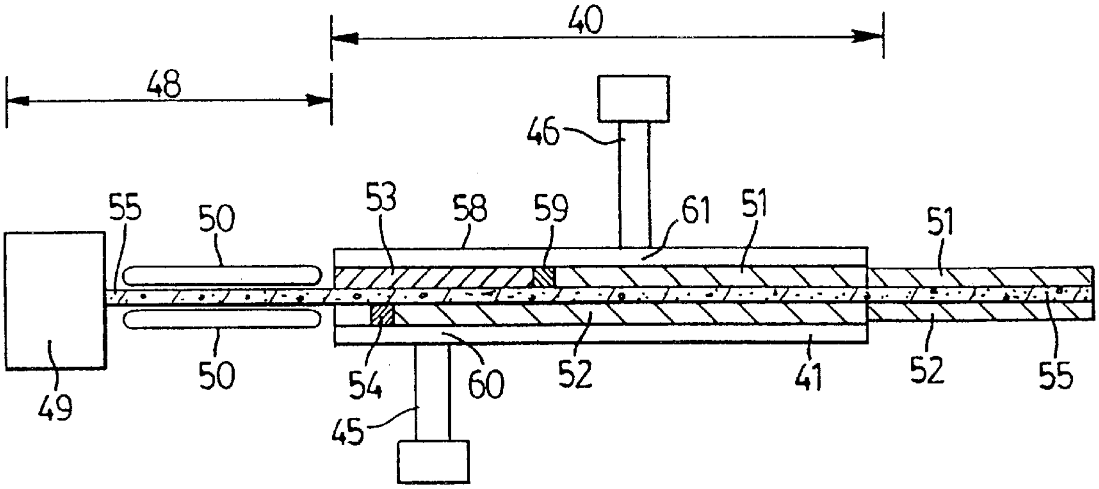
FIG. 3 is a cross-sectional view of a plan of FIG. 2 through the plane indicated by X—X in FIG. 2.

The building panel 10 may be made by a process which is illustrated in FIGS. 2 and 3. The expanded form 55 may be prepared in an expanded form manufacturing and transport section 48 and delivered to a building material forming section 40. FIGS. 2 and 3 show a continuous extrusion or fusion machine 49 which forms an expanded form 55 in a shape as required for the finished building panel, e.g. in the shape shown as form 13 in FIG. 1. The expanded form 55 is then guided by continuous conveyors 50 into a guiding channel 58 of building panel forming section 40. The guiding channel 58 comprises two cooperating longitudinal mould sections 41 and 42 of a split mould. The cross-sectional shape of the guiding channel 58 is made to conform to the exterior cross-sectional shape of the required building panel 10.

As expanded form 55 enters the inlet to forming section 40 it passes between a back plate 53 and sealing sleeve 54.

Back plate 53 is between mould section 42 and expanded form 55 and extends between the inlet of guiding channel 58 and sealing sleeve 59. Sealing sleeve 54 is just upstream of concrete inlet 60 in mould section 41 and sealing sleeve 59 is just upstream of concrete inlet 61.

A short distance from the inlet of the guiding channel 58 there is a concrete pump 45 or similar which is adapted to pump concrete into one side of the guiding channel 58 through inlet 60 in mould section 41. The size of inlets 60 and 61 will depend in part on the consistency of the facing material, e.g. concrete, and the pumping capacity of the pumps 45 and 46. For example, inlet 60 may extend substantially from the top to the bottom of the mould 41 or may be narrower, e.g. be a large diameter pipe. A similar concrete pump 46 is situated on the opposing side of the guiding channel 58, preferably at a location downstream of the location of concrete pump 45. This is a preferred arrangement, but concrete pump 46 may be directly opposite to concrete pump 45. Preferably, the distance between concrete pumps 45 and 46 is from 15 to 45 cm.

It will be understood that mould sections 41 and 42 should be adequately supported so that they do not bow or deform vertically of horizontally under the weight of the continuously forming building panel or under the pressure from the concrete being extruded into guiding channel 58. Typically, the mould sections 41 and 42 are made of polyurethane and are supported by beams of steel or aluminum. Preferably the mould sections 41 and 42 are lined, upstream of inlet apertures 60 and 61 with a material of low coefficient of friction, e.g. aluminum, steel, high density polyethylene, ultra high molecular weight polyethylene or a fluoropolymer such as polytetrafluoroethylene (e.g. Teflon®). The sealing sleeves 59 and 54 are typically of a low friction polymeric material, e.g. high density polyethylene, aluminum or steel. There may be apertures 47 in the sides of mould sections 41 and 42, downstream of concrete pumps 45 and 46. Typically for concrete, apertures 47 are from 12–20 mm in diameter, depending on the consistency of the concrete mixer. Other sizes may be more appropriate for plaster, gypsum or other facing materials.

Figure 4:
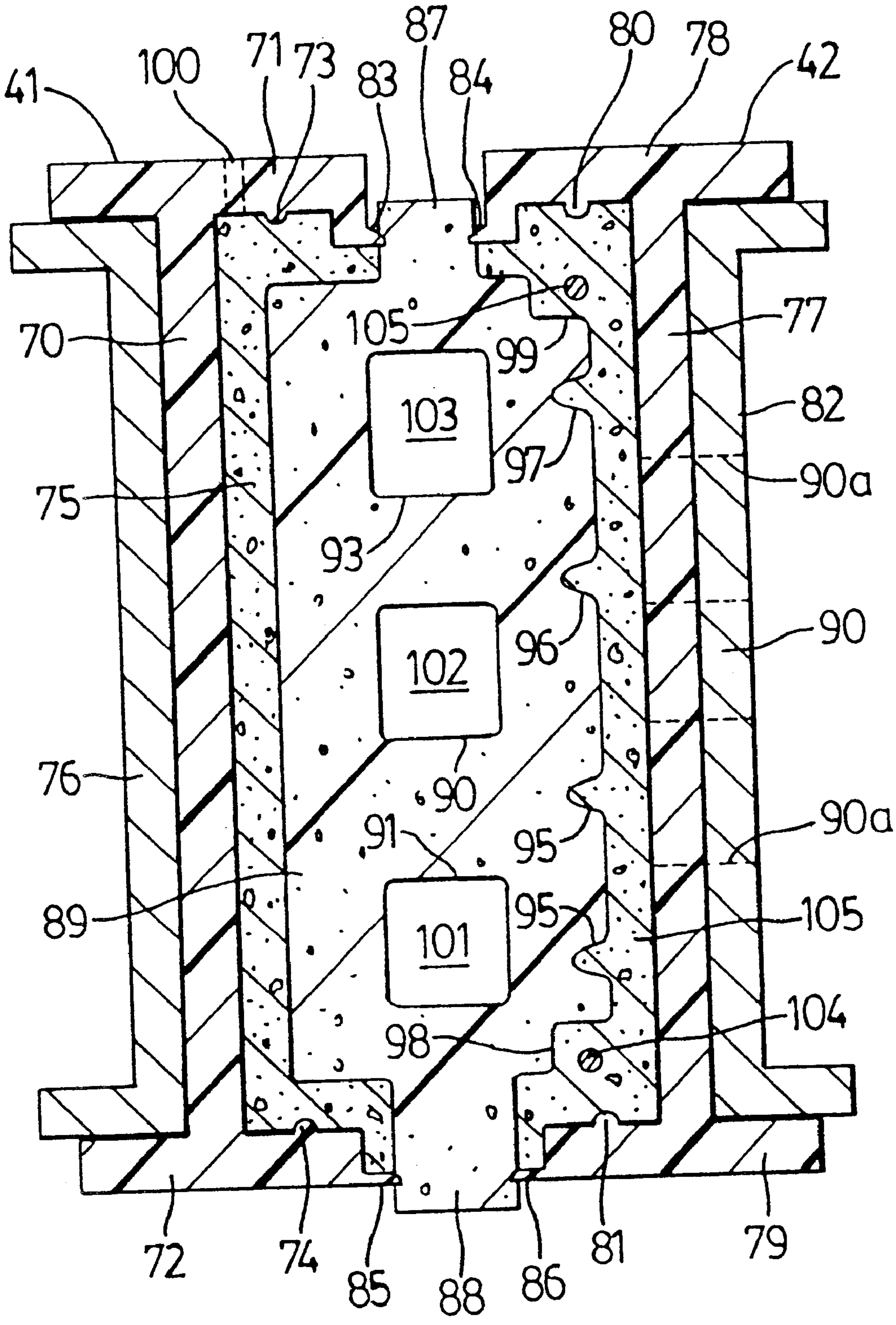
FIG. 4 is a cross-sectional view of a split mould, and a building panel in a guiding channel of the present invention.

The process for making a building panel is illustrated further by reference to FIG. 4. The guiding channel comprises a longitudinally split mould, which consists of first longitudinal mould section 41 and second longitudinal mould section 42. First mould section 41 has a main wall 70, an upper wall 71 and a lower wall 72. Upper wall 71 has a control joint ridge 73 which corresponds to a control joint groove in concrete layer 75 of the building panel. Lower wall 72 has a similar control joint ridge 74. Main wall 70 is supported and prevented from bowing outwardly by steel beam 76. Second mould section 42 has a similar main wall 77, upper wall 78, lower wall 79 and control joint ridges 80 and 81, and is supported by steel beam 82. First mould section 41 has a relief vent 100. Second mould section 42 also has a vent but is not shown as, in this embodiment, it is downstream of relief vent 100.

Upper walls 71 and 78 have sealing lips 83 and 84 respectively, and lower walls 72 and 79 have sealing lips 85 and 86 respectively. Sealing lips 83 and 84, and sealing lips 85 and 86 are spaced apart sufficiently to provide sliding seals with tongues 87 and 88 of expanded form 89. The spacing is effected by clamps which are not shown.

Mould section 42 and beam 82 have a concrete inlet 90 into which concrete may be fed.

In the embodiment shown in FIG. 4, expanded form 89 has three longitudinal internal cavities 91, 92, 93, four longitudinal external grooves 94–97, and two external corner grooves 98 and 99. It will be understood that the number and shape of any internal cavities and external grooves may be changed to suit the particular building product. For example there may be a single internal cavity or many internal cavities; they may be square, rectangular, circular or any other shape in cross-section. Similarly, the number and shape of any external grooves may be changed to suit the particular building product. For example, the grooves may be semi-circular, triangular, rectangular in cross-sectional shape and they may be on one side of a building panel or both sides, depending upon the purpose to which the panel is to be put.

In the process of making the building panel shown in FIG. 4, expanded form 89 is pushed into the guiding channel so that tongue 87 is slidingly guided between sealing lips 83 and 84, and tongue 88 is slidingly guided between sealing lips 85 and 86. Mandrels 101, 102 and 103, in cavities 91, 92 and 93 respectively also assist in guiding expanded form 89. Mandrels 101, 102 and 103 also function to prevent crushing of the expanded material into cavities 91, 92 and 93 as a result of pressure exerted on expanded form 89 when concrete is pumped into the cavities between expanded form 89 and mould sections 41 and 42. Mandrels 101, 102 and 103 extend from the extrusion or fusion machine (not shown) to a position just downstream of the second concrete pump (not shown).

As the-expanded form 89 is pushed into the inlet of the guiding channel, so are steel rods 104 and 105. They are guided so that they are situated in the spaces formed by longitudinal corner grooves 98 and 99 respectively. Steel rods 104 and 105 provide additional strength to the building panel, and are generally only required for load-bearing building panels such as for roofs.

Concrete 75 is first pumped into the cavity between mould section 41 and expanded form 89. Concrete 106 is then pumped through an aperture 90 (the extent of which is delineated by walls 90*a*) into the cavity between mould section 42 and expanded form 89. Excess pressure may be relieved through vent 100. Concrete 106 also moves into longitudinal grooves 94–97 to provide better bonding between concrete 105 and expanded form 89, and to assist in preventing problems associated with slumping of the concrete and structural strength benefits. Such grooves may be cut into the expanded form immediately after extrusion or the expanded form may be extruded with the grooves.

Any suitable extrusion or fusion machine 49 may be used in the present process. Although the apparatus has been described above with an expanded polymer formation and conveying section, the formation of the expanded form material can be made at a separate location and the expanded form 55 be fed in by other means, e.g. a conveyor or a hydraulic ram.

Figure 5:
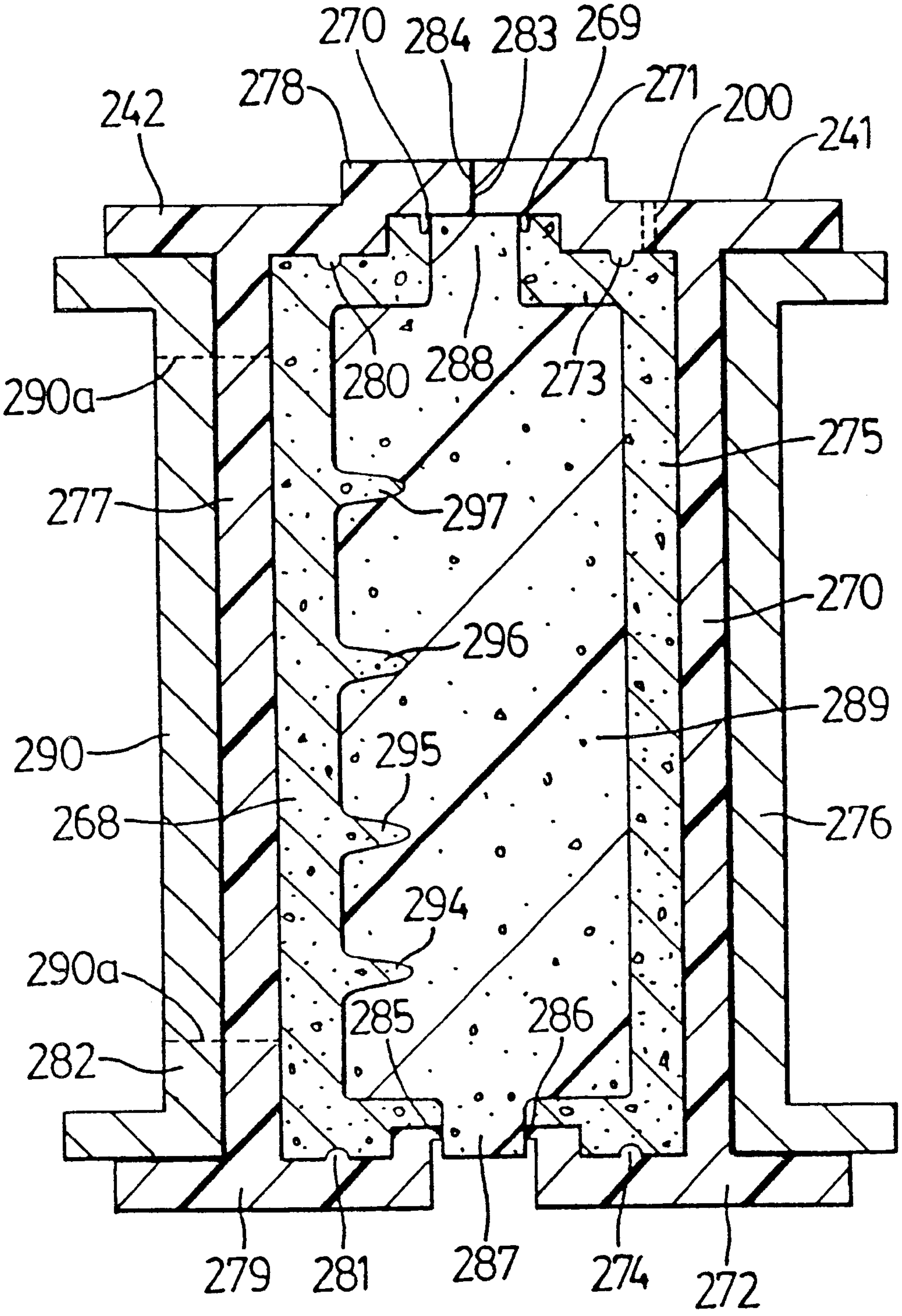
FIG. 5 is a cross-sectional view of another split mould and a building panel in a guiding channel of the present invention.

When the expanded synthetic polymeric form 89 has tongues 87 and 88, at least one of the tongues e.g. 88 may need to be trimmed after the concrete layers have been added. This can be done relatively easily by hot wire cutting of the tongue. Preferably, however, the expanded synthetic polymeric form is made so that no post-trimming is necessary. A suitable split mould for processing such expanded synthetic polymeric form is shown in FIG. 5. It will be understood that other arrangements for split moulds may be used, depending on the desired shape and form of the building product.

In FIG. 5, the guiding channel comprises a longitudinally split mould, which consists of first longitudinal mould section 241 and second longitudinal mould section 242. First mould section 241 has a main wall 270, an upper wall 271 and a lower wall 272. Upper wall 271 has a control joint ridge 273 which corresponds to a control joint groove in concrete layer 275 of the building panel. Lower wall 272 has a similar control ridge 274. Main wall 70 is supported and prevented from bowing outwardly by steel beam 276. Second mould section 242 has a similar main wall 277, upper wall 278, lower wall 279 and control joint ridges 280 and 281, and is supported by steel beam 282. First mould section 241 has a relief vent 200. Second mould section 242 also has a vent but is not shown as, in this embodiment, it is downstream of relief vent 200.

Upper walls 271 and 278 have abutting edges 283 and 284 respectively, and lower walls 272 and 279 have sealing lips 285 and 286 respectively. Sealing lips 285 and 286 are spaced apart sufficiently to provide sliding seals with tongue 287 of expanded form 289. The spacing is effected by clamps which are not shown.

Abutting edges 283 and 284 are held together by clamps, which are not shown. Upper walls 271 and 278 have longitudinal ridges 269 and 270 respectively. Longitudinal ridges 269 and 270 form guides for keeping tongue 288 from freely floating within the split mould cavity. It will be understood that tongue 288 may be positioned using means other than ridges 269 and 270. For example a single triangularly-shaped ridge on the split mould may be used, and correspond with a triangularly-shaped longitudinal notch in tongue 288.

Mould section 242 and beam 282 have a concrete inlet 290 (the extent of which is delineated by walls 290*a*) into which concrete may be fed.

In the embodiment shown in FIG. 5, expanded form 289 has four longitudinal external grooves 294 and 297.

In the process of making the building panel shown in FIG. 5, expanded form 289, which has tongues of the length required in the finished building panel, is pushed into the building channel so that tongue 287 is slidingly guided between sealing lips 285 and 286 and tongue 288 is slidingly guided between longitudinal ridges 269 and 270.

Concrete 275 is first pumped into the cavity between mould section 241 and expanded form 289. Concrete 268 is then pumped through aperture 290 into the cavity between mould section 242 and expanded form 289. Excess pressure may be relieved through vent 200. Concrete 268 also moves into longitudinal grooves 294 and 297.

Referring again to FIGS. 2 and 3, in operation expanded synthetic polymeric form 55 is formed with polymer extrusion machine 49, using suitable extrusion dies to form the desired cross-sectional shape of expanded form 55. The expanded form 55 is then transported by cooperating continuous conveyors 50 so that expanded form 55 is fed into the inlet of guiding channel 58. The expanded form 55 is fed between sealing sleeves 59 and 54. One of the purposes of the sealing sleeves 59 and 54 is to prevent escape of concrete upstream of the concrete inlets 60 and 61. In the embodiments shown in FIGS. 2 and 3, concrete pumps 45 and 46 are separated longitudinally along the guiding channel. In this embodiment, concrete pump 45 first pumps concrete into the gap between beam 41 and expanded form 55. The opposing side of expanded form 55 is supported by back plate 53 so that the thickness of concrete layer 52 is kept substantially constant. In order to attenuate any pressure surges of the concrete as it enters the guiding channel, apertures 47 may provide some pressure relief. Concrete is then injected by concrete pump 46 into guiding channel 58, so that a layer of concrete 51 forms on the opposing side of expanded core 55 to concrete layer 52. Vibrators or other mechanisms may be used to assist in packing the concrete.

The length of the guiding channel 58 is dependent on the speed of the process and the setting time for the concrete. As will be understood, different concrete mixtures will require different lengths of guiding channel. It may be necessary, therefore to have several adjoined sections of guiding channel 58. After leaving the guiding channel, the continuous building panel is supported and may be fed into a curing section and/or a section with a cutter, in order to form building panels of known length. The cut-to-length building panels are then loaded on pallets, ready for additional curing, further processing or shipping to a customer.

The expanded form 55 may be "solid" as shown in FIG. 1 but also may be made with longitudinal cavities as shown in FIG. 4, or transverse cavities. Such cavities allow for ease of installation of plumbing and wiring during installation at the building site. It will be understood that the transverse cavities are usually formed after making the building panel in the above process, for example by coring out the cavities.

It will be understood that building products may also be made with an expanded form which is not exposed along the longitudinal edges, i.e. is not totally enveloped in facing material. In the case where one longitudinal edge of a building panel is coated with concrete, the split mould shown in FIG. 4 may be modified so that lips 85 and 86 abut one another to form a seal. In such a case, the form 89 would be guided by upper lips 83 and 84 and/or internal mandrels 101, 102 and 103.

Figure 6:
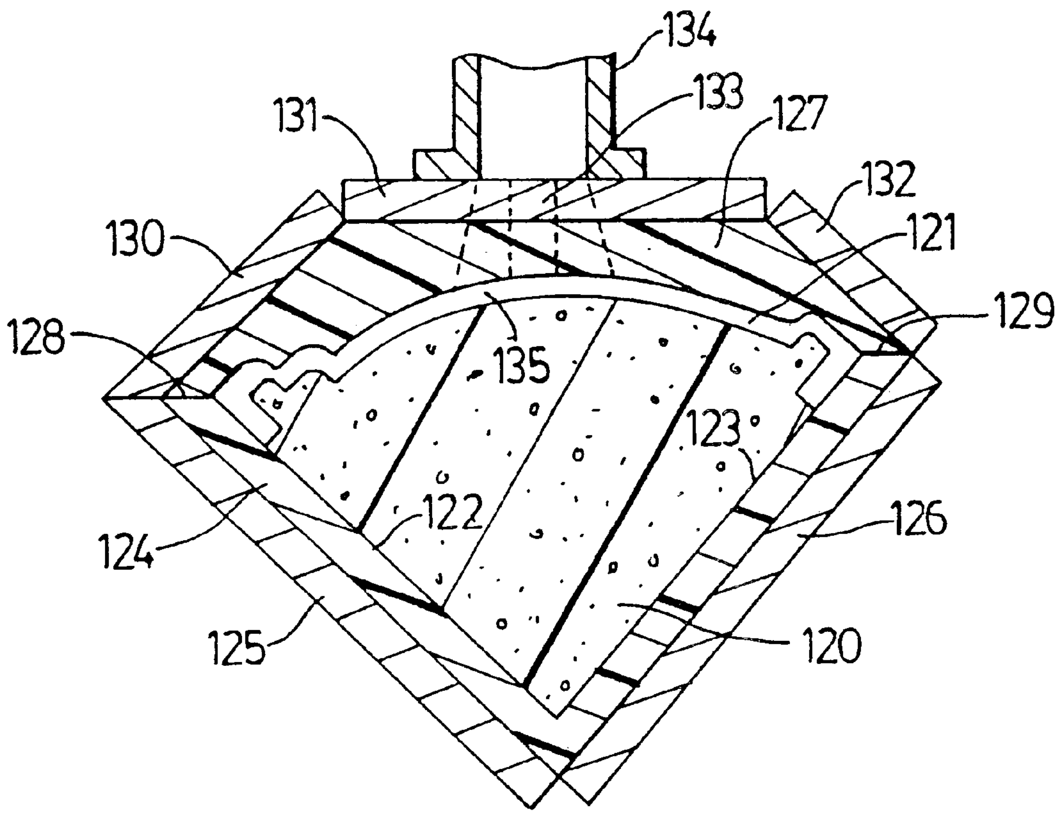
FIG. 6, which is after

It is further understood that although the above description refers only to concrete as the outer layers, other materials may be used, for example plaster, as is described in reference to FIG. 6.

A corner moulding strip may comprise an expanded form 120 and a facing material 121. As will be seen, expanded form 120 has two faces 122 and 123 which are not coated with the facing material. Faces 122 and 124 are in sliding engagement with V-shaped first mould section 124 of a two-part split mould. The outer surfaces of first mould section 124 are supported by steel beams 125 and 126. Second mould section 127 is in direct contact with first mould section 124 at longitudinal edges 128 and 129. Second mould section 127 is prevented from bowing outwards by steel beams 130, 131 and 132. Second mould section 127 has an internal cross-sectional shape to conform to the desired external cross-sectional shape of the finished moulding strip. Beam 131 and second mould section 127 have an aperture 133, through which plaster may be pumped, from 134. In the case of the process illustrated with reference to FIG. 6, there is only one pump and facing material inlet for introduction of facing material 121. The process may also be operated to insert a glass fibre or similar scrim between facing material 121 and expanded form 120, or to embed the scrim in facing material 121. Facing material 121 may be concrete, plaster of Paris, stucco or any other suitable material.

Figure 7:
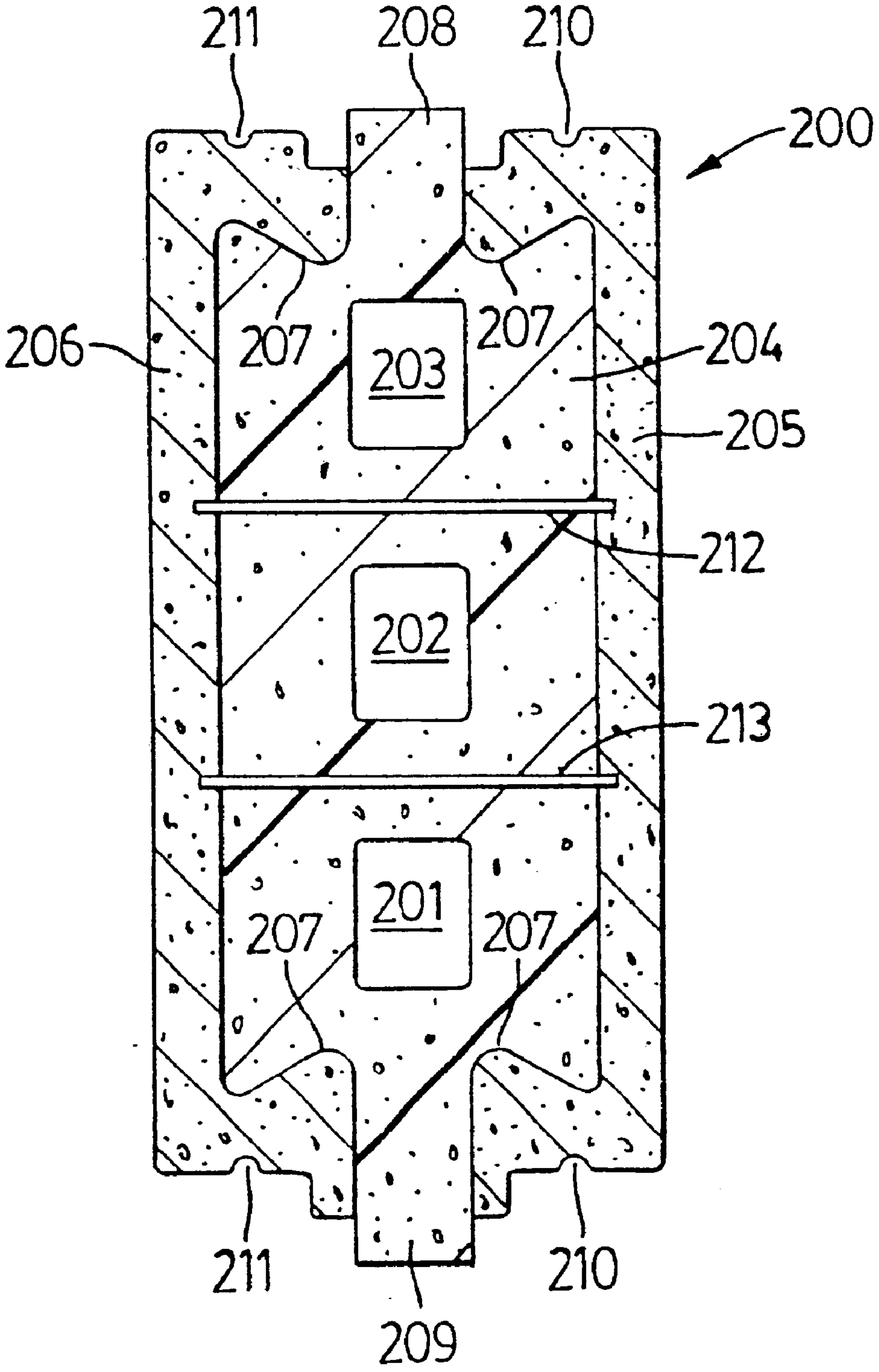
FIG. 7 is a cross-sectional view of building panel of the present invention with a dovetail joint between the facing material and the expanded form, and a transverse tie.

In the embodiment shown in FIG. 7, building panel 200 has an expanded form 204 with three longitudinal internal cavities 201, 202 and 203. Expanded form 204 also has external dovetail indentations 207. It will be understood that the number and shape of any internal cavities and external dovetail indentations may be changed to suit the particular building product. For example there may be a single internal cavity or many internal cavities; they may be square, rectangular, circular or any other shape in cross-section.

Similarly, the number and shape of any external dovetail indentations may be changed to suit the particular building product. For example, the indentations may be triangular or rectangular in cross-sectional shape and they may be on one side of a building panel or both sides, depending upon the purpose to which the panel is to be put.

The building panel shown in FIG. 7 is faced on one side with concrete facing 205 and on the other side with concrete facing 206. The concrete facings have complementary dovetail protrusions which are formed within dovetail indentations 207 so that there is a mechanical joint between the facings and the expanded form. The expanded form 204 has opposing tongues 208 and 209 and concrete facings 205 and 206 have control joint ridges 210 and 211 respectively, similar to those shown in the embodiment of FIG. 4.

The building panel of FIG. 7 also has ties 212 and 213, which are transversely placed through expanded form 204. The ends of ties 212 and 213 protrude from expanded form 204 into the facing materials 206 and 207, to provide a mechanical means for strengthening the building panel 200 and providing rigidity thereto. Ties 212 and 213 are preferably plastic or metal. Suitable plastics and metals are known in the art. Although FIG. 7 shows the building panel having ties in addition to a mechanical locking joint, it may not be necessary or desirable to have both.

It will be understood that building panel corner pieces and T-pieces can also be made using the present process. Alternatively panels such as the one shown in FIG. 1 can be cut or adapted to form a corner or a T of a building or wall.

The split mould used in the present invention preferably has a stationary mould section and a movable mould section. The movable mould section may be moved entirely away from the stationary mould section for cleaning and other purposes. Alternatively the movable mould section may swing away from the stationary mould section, i.e. be pivoted at one end.

What is claimed is:

1. A continuous process, with upstream-and downstream longitudinal directions, for making an elongated coated building product comprising a longitudinal expanded synthetic polymeric form having a desired cross-sectional shape, and having a longitudinally continuous coating of a facing material on at least a portion of a periphery of the cross-sectional shape, said process comprising:

a) feeding the expanded-synthetic polymeric form longitudinally into the inlet of an elongated guiding channel which comprises a longitudinally split mould having an internal cross-sectional shape suitable to produce a desired external cross-sectional shape of the coated building product;

b) guiding the expanded synthetic polymeric form along the guiding channel, without any means for pulling the expanded synthetic polymeric form after the expanded synthetic polymeric form enters the inlet of the guiding channel;

c) feeding the facing material into the split mould through a first aperture in a first mould section of the split mould.

2. A process according to claim 1 wherein the split mould is a two-part split mould and the facing material is additionally fed through a second aperture in a second mould section of the split mould, so that the facing material is coated on at least two opposing sides of the expanded synthetic polymeric form.

3. A process according to claim 1 wherein facing material is prevented from escaping upstream towards the inlet by sealing means between the split mould and the expanded synthetic polymeric form.

4. A process according to claim 1 wherein the coated building product is a moulding strip with at least one exposed face of the expanded synthetic polymeric form, in which process the exposed face is in sliding contact with a second mould section of a two-part split mould which has no apertures therein for introduction of facing material.

5. A process according to claim 4 wherein the facing material is plaster.

6. A process according to claim 1 wherein the building product is a building panel which is coated on at least two sides with a facing material selected from the group consisting of concrete and gypsum, in which process the expanded form is guided between first and second mould sections of a two-part split mould, facing material is fed through a first aperture in the first mould section and through a second aperture in the second mould section.

7. A process according to claim 2 wherein the second aperture is downstream of said first aperture and there are sealing strips between the expanded synthetic polymeric form and the first and second mould sections, at positions slightly upstream of the first and second apertures.

8. A process according to claim 1 wherein there is a back pressure plate between the second mould section and the expanded synthetic polymeric form between the inlet of the guiding channel and the sealing strip which is upstream of the second aperture.

9. A process according to claim 2 wherein the polymeric expanded material is continuously provided from an extrusion or fusion machine upstream of the inlet to the guiding channel.

10. A process according to claim 1 wherein the expanded synthetic polymeric form is made from expanded polystyrene, polyurethane, phenolic or polyisocyanurate.

11. A process according to claim 6 wherein the expanded synthetic polymeric form is made from expanded polystyrene, polyurethane, phenolic or polyisocyanurate.

12. A process according to claim 1 wherein the facing material is selected from the group consisting of concrete, gypsum and plaster.

13. An apparatus for a continuous process, with longitudinal upstream and downstream directions, for making an elongated coated building product comprising a longitudinal expanded synthetic polymeric form, said apparatus comprising:

a) an elongated guiding channel which has a longitudinally split mould having an internal cross-sectional shape suitable to produce a desired external cross-sectional shape of the coated building product, said guiding channel having an inlet and an outlet;

b) means for guiding the expanded synthetic polymeric form along the guiding channel, without any means for pulling the expanded synthetic polymeric form after the expanded synthetic polymeric form enters the inlet of the guiding channel;

c) means for feeding facing material into the split mould through a first aperture in a first mould section of the split mould; and d) sealing means in the guiding channel to prevent facing material escaping upstream between the expanded synthetic polymeric form and mould sections, towards the inlet of the guiding channel.

14. An apparatus according to claim 13 wherein there is means for feeding facing material into the split mould through a second aperture in a second mould section of the split mould.

15. An apparatus according to claim 14 wherein the second aperture is downstream of said first aperture and there is a sealing strip between the polymeric expanded material and the second mould section at a position slightly upstream of the second aperture.

16. An apparatus according to claim 13 wherein an extrusion or fusion machine for continuously making polymeric expanded material is provided upstream of the inlet to the guiding channel, for feeding polymeric expanded material into the inlet of the guiding channel.

* * * * *